Oct. 23, 1956  H. W. DONOVAN  2,768,258
SWITCHING APPARATUS
Filed April 27, 1954
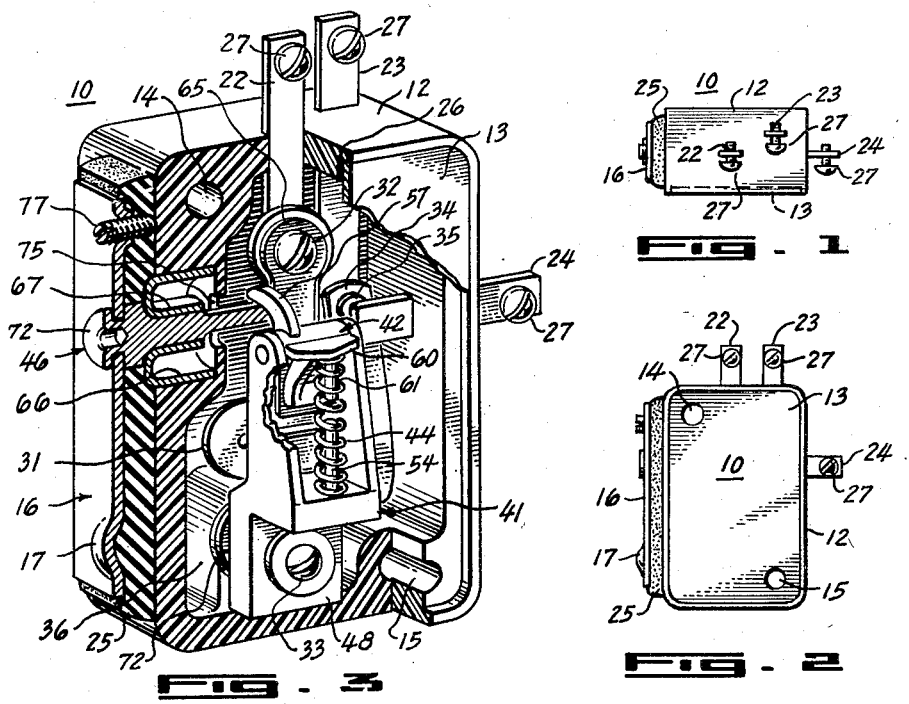
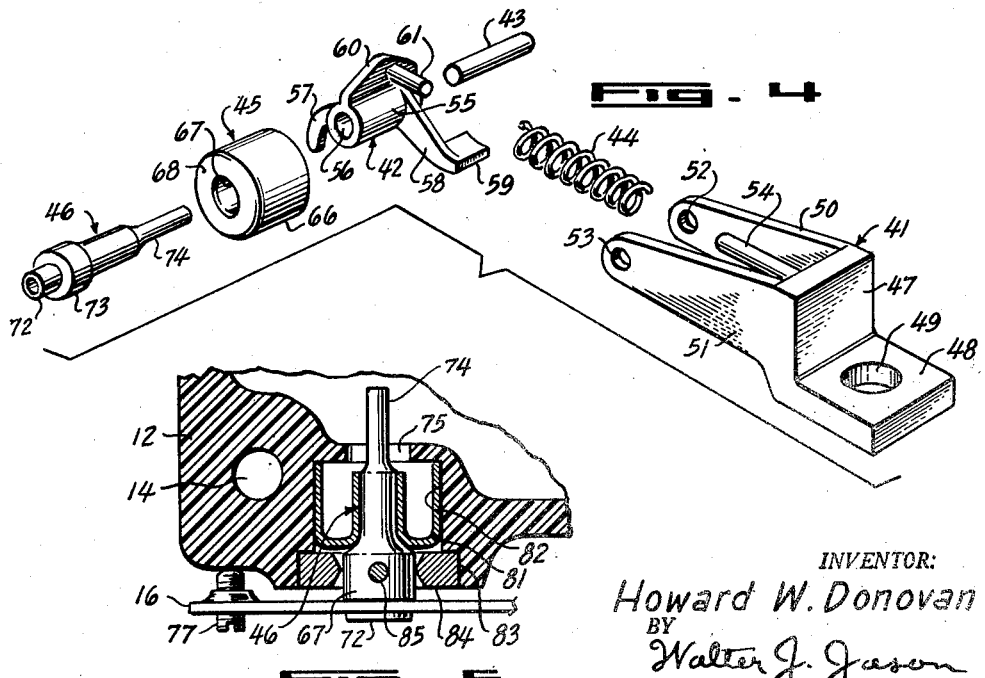
INVENTOR:
Howard W. Donovan
BY
Walter J. Jason
ATTORNEY

United States Patent Office 2,768,258
Patented Oct. 23, 1956

2,768,258

SWITCHING APPARATUS

Howard W. Donovan, Fort Worth, Tex., assignor, by mesne assignments, to General Dynamics Corporation, a corporation of Delaware Application April 27, 1954, Serial No. 425,930

11 Claims. (Cl. 200—67)

This invention relates generally to electrical switches and more particularly to hermetically sealed switches used for interruption of electrical energy in controlling the various operations of electrical and mechanical equipment.

Electrically controlled equipment depends to a large extent upon reliable operation of electrical limit switches, and reliability must be realized even though the equipment and the switches are exposed to wide ranges of environmental conditions. In aircraft applications, for example, a switch is expected to operate satisfactorily at sea level, where high humidity and corrosive characteristics of the atmosphere, such as salt air, may be encountered, as well as at high altitudes where little moisture is encountered, but very low ambient pressures and temperatures prevail. Moisture encountered in the air at low altitudes may condense on switching contacts in such a manner that subsequent freezing at high altitudes may reduce the effectiveness and reliability of the switching element. Furthermore, a decrease in air pressure due to an increase in altitude may change the dielectric characteristics of the switching components to a state inviting malfunction due to arcing.

It is, therefore, an object of the present invention to provide a switch which is completely immune to changes in environmental conditions and which has increased actuation response.

Another object of the present invention is to provide an economical hermetically sealed switch having reduced size and weight characteristics whereby sealed switches can be readily substituted for unsealed switches.

Another object of the present invention is to provide a hermetically sealed switch capable of withstanding increased actuating overloads while having improved sensitivity to small actuating forces.

Other objects and features of this invention will be readily apparent to those skilled in the art from the following specification and appended drawings illustrating certain preferred embodiments of this invention in which:

Figure 1 represents an end view of a switch unit of the present invention,

Figure 2 represents a plan view of the switch unit,

Figure 3 is a cut-away perspective view illustrating one embodiment of the invention, Figure 4 illustrates the actuating mechanism of the switch shown in Figure 3, and Figure 5 illustrates another embodiment of the sealing member wherein independent pivoting means are incorporated.

Referring now to Figures 1 and 2, a switch unit 10 is shown generally which includes a housing 12, formed of plastic, metal, or other suitable material serving to enclose an hermetically seal a switching member and its associated mechanism. With one side open, housing 12 is provided with a cover plate 13, which is adapted to effectively seal this side of housing 12. Mounting holes 14 and 15, which project through the housing 12 and plate 13, allow a plurality of units to be mounted in a bank. An operating lever 16 is interconnected with a sealing element to be described in detail hereinafter and is adapted to be depressed by the application of a force applied to area 17. When depressed, lever 16 serves to actuate a switching member carried within the housing 12 to selectively connect contacts 22, 23, and 24 in circuit. For example, assuming a normal condition with no actuating force being applied to member 16, terminal 22 may be connected through the switching member to terminal 23. Upon the application of a force to area 17, lever 16 will be depressed and the resilient switching member will be actuated and terminal 22 will then be connected in circuit with terminal 24 and disconnected from terminal 23. Upon release of the operating force applied to member 16, the connections between terminals 22, 23 and 24 are restored to the assumed normal condition. Thus, it may be seen that the switch 10 provides an electrical circuit from a common terminal, such as 22, through a normally closed contact 23 or through another contact which forms the normal open contact 24. It should be understood that the contact combinations or the number or the relationship of the contacts being switched form no part of the present invention but are merely illustrative of the switching action. As shown, a resilient pad 25 may be disposed between operating lever 16 and housing 12 to prevent the formation of ice or the accumulation of foreign materials therebetween, which would prevent actuation of operating member 16.

Referring now to Figure 3 which illustrates in more detail the present invention, switch unit 10 is shown comprising the housing 12 provided with the cover plate 13, which is hermetically bonded into a recess in the open side of housing 12 by a suitable gasket 26. Terminals 22, 23, and 24, which are made of an electrically conductive material, such as brass, pass through side portions of housing 12 and are securely and hermetically bonded thereto. Where housing 12 is formed of a non-conductive material, of course, no insulation of the terminals is required. However, where the housing 12 is formed of a conductive material, a suitable non-conductive member disposed between the walls of the housing and the terminals is essential and should also provide the hermetic seal therebetween. As shown, each of the terminals 22, 23, and 24 is provided with connecting means 27 for attachment with electrical lead wires of a circuit (not shown).

Supported within switch housing 12 is a resilient switching member 31 having one end connected with terminal 22 by a suitable attachment member 32, another end fixedly attached to the housing 12 by attachment member 33, and having an arm portion 34, with contacts 35 mounted thereon, free to move in response to an applied force. The particular embodiment of switch member 31, in itself, is not an essential element of the present invention and it will be apparent to one familiar with the particular art that anyone of many configurations may be effectively utilized. The switching element 31 shown in Figure 3 is similar to that illustrated by Figures 17, 18, 19 and 20 and described in columns 7, 8 and 9 of United States Patent No. 2,630,504 entitled "Motion Translating Device" and issued to L. W. Burch et al. This device, like so many others which move with a snap action, consists of a strip of thin, resilient material substantially longer than it is wide and is placed under tension by its mounting in housing 12 between terminal contact 22 and a boss 36 formed as an integral portion of housing 12. The upper face of boss 36 forms the mounting surface for the one end of switching member 31 and is in a somewhat lower plane than the internal end of terminal 22 to which the other end of member 31 is mounted. Furthermore, the spacing between centers of the mounting portion of terminal 22 and the boss 36 is greater than the distance between the center-lines of the mounting holes associated with the ends of snap element 31. Consequently, when element 31 is installed, tension is applied to its opposite ends and at a substantial angle to the axis of the element. This externally applied stress sets up complex internal stresses which result in distortion or warpage of the metallic element 31 and due to the fact that the attachment ends of the resilient switching member 31 are mounted in different planes, the member 31 will always tend to warp in the same direction. Hence, the free arm portion 34 carrying the movable electrical contacts 35 will normally be biased against the terminal 23 so that contact 35 is in engagement therewith. The warping of the switch element 31 can be temporarily reversed to lift arm 34 and contact 35 away from terminal 23 by the application of an actuating force to a preselected area on element 31. When the force is applied to this area by an actuating mechanism to be hereinafter described, the movable arm 34 is caused to move with a snap-action to an alternate position. Contact 35, which had been in electrical contact with the normally closed terminal 23, is moved away from said terminal 23 and is forced into contact with the normally open terminal 24. Upon release of the actuating pressure on element 31, the movable arm 34 and contact 35 will snap back to the original, normally closed position due to the internal stresses previously set up in the switch element, thereby causing contact 35 to be disconnected from terminal 24 and interconnected with terminal 23. It then becomes apparent that if terminal 22 is connected to a source of electrical energy, in the normal condition of switching member 31 current will be allowed to flow through terminal 22, switch element 31, movable arm 34, contact 35, and terminal 23. Then, by the application of an actuating force to snap member 31 whereupon member 31 is driven to its operated position, current will be allowed to flow through contact 35 to terminal 24. The structure and mode of operation of switching member 31 is more fully disclosed by Figures 17–20 and columns 7–9 of U. S. Patent No. 2,630,504 referred to hereinabove. An actuating mechanism for developing the actuating force applied to switching member 31, as illustrated in more detail in Figure 4, comprises a clevis 41, pawl 42, a retaining pin 43, return spring 44, sealing member 45, and driving member 46. Clevis 41 provides a means for supporting pawl 42 for pivotal movement within housing 12 and comprises a bifurcated support member 47 having an angularly disposed base portion 48 with a mounting hole 49 therein. Clevis 41 also includes a pair of spaced-apart outwardly extending legs 50 and 51 integral with member 47 and adapted to receive pawl 42 therebetween. Near the outer end of each of said leg members 50 and 51 are aligned apertures 52 and 53, respectively, which are adapted to receive retaining pin 43. Centrally located between members 50 and 51 of clevis frame 41 and extending outwardly from support member 47 is a pin 54 which is adapted to engage and retain return spring 44.

Pawl 42 serves to apply a depressing force to resilient switching member 31 and, as illustrated in Figure 4, includes a cylindrical body portion 55 with a bore 56, adapted for receiving retaining pin 43, extending therethrough. Integral with said body portion 55 is an outwardly extending actuating arm 57 arranged for operative engagement with driving member 46 to provide rotational motion to the pawl 42 upon actuation of driving pin 46. Also made integral with cylinder 55, but peripherally displaced from arm 57, is an angularly extending member 58 having an arcuate surface 59 formed thereon which may be utilized to apply the depressing force to the specific area of switch element 31 upon actuation of pawl 42. As shown, a longitudinally extending rib 60 is formed integral with or secured to body portion 55. Projecting from rib 60 at a central position with respect to cylinder 55, is a pin 61 adapted to be received by an open end of spring 44 in a manner similar to pin 54 associated with clevis 41.

Upon assembly, pawl 42 fits between extended members 50 and 51 of clevis 41 and the retaining pin 43 is inserted through the aligned apertures 52 and 53 and bore 56. Since the diameter of bore 56 is slightly smaller than the diameter of the pin 43, when the pin is pressed therein the parts become essentially permanently assembled. Holes 52 and 53 have a diameter slightly larger than that of pin 43 so that pin 43 is carried therein in what is commonly known as a running fit and thereby assures that pawl 42 is free to pivot with respect to clevis 41. However, with pawl 42 supported by clevis 41, spring 44 is carried by the oppositely extending pins 54 and 61 and serves to resiliently bias pawl 42 against pivotal movement.

As will be apparent, clevis 41, pawl 42, retaining pin 43, and spring 44 may comprise a sub-assembly which can be installed in housing 12 as a complete unit, as illustrated in Figure 3. In the installation clevis 41 is positioned over the switching element 31 and over the raised boss 36, and pawl 42 is thereby positioned to become operatively associated with the resilient switch member 31 to suitably apply the depressing force thereto. If clevis 41 and pawl 42 of the actuating mechanism are fabricated of an electrically conductive material such parts should be electrically insulated from the resilient switch member 31 to insure that the flow of electrical energy will not be through the actuating mechanism. Therefore, prior to installation an insulating bushing (not shown) is placed over the attachment rivet 33 and in abutting relationship against the upper surface of boss 36 to thereby insulate switch element 31 from the attachment rivet 33, which secures clevis 41 to the housing 12. In addition, where pawl 42 is formed of a conductive material, surface 59 must also be insulated from switching member 31; and hence a sheet of insulating material 65 may be interposed therebetween and secured to the resilient switch member 31 by attachment screw 32.

As illustrated in Figure 4 and described hereinbefore, the actuating mechanism of the invention includes sealing member 45 and driving means 46 which comprise the selectively deformable sealing element adapted to seal an opening in switch housing 12. Sealing member 45 is carried in a wall of housing 12, as shown in Figure 3, and is capable of being distorted from its normal, unstressed shape to transmit the operating motion through the sealed wall of the housing 12 to the pivotally supported pawl 42 for applying the actuating force to switching member 31. Sealing member 45 is formed of a metallic, or suitable plastic, material into a generally semi-toroidal surface, and as shown by the drawings, includes an endless outer surface 66, an endless inner surface 67, and an interconnecting arched surface 68. Thus it becomes apparent that sealing member 45 may be characterized by a surface having a substantially U-shaped cross-sectional configuration rotated about an axis established parallel to and outside one leg of the U. Sealing member 45 fits snugly into a mating cavity 71 in the side of switch housing 12, in the manner illustrated by Figure 3. The outer periphery of outer surface 66 is securely and hermetically bonded to the wall of the cavity 71, thereby providing a hermetic seal therebetween. Similarly, the inner periphery of surface 67 is secured and hermetically bonded to the shaft body of driving means 46, thereby also providing a hermetic seal therebetween. As shown, one end 72 of driving pin 46 may have the form of a tubular rivet with a shoulder portion 73 formed thereon to provide a convenient means of attachment for operating lever 16, whereas, the other end portion 74 of driving member 46 may be formed for operative engagement with actuating arm 57 of pawl 55. Rod end 74 is adapted to pass through an elongated slot 75 formed in the body of switch housing 12 and to extend therethrough into the interior of switch housing 12 for engagement with pawl 55. This flexible metallic sealing member 45 mounted in the wall of housing 12, by its configuration, allows the surface bonded to drive member 46 to be selectively movable with respect to the surface hermetically sealed to the wall. Hence, a force applied to the exterior end portion 72 of drive member 46 produces relative movement of inner surface 67 and interiorly disposed rod end 74, which is operatively associated with arm 57 of pawl 55, transmits the force thereto.

Although the annular configuration of sealing member 45 is preferable, it will be apparent to one familiar with the particular art that the configuration of surfaces 66 and 67 of sealing member 45 need not necessarily be annular for it is contemplated that other arrangements may be utilized, such as rectangular, square or elliptical configurations. Furthermore, it is also contemplated that sealing member 45 and drive means 46 may be embodied in a unitary device whereby the relatively movable surface 67 is extended and fabricated into a functionally similar structure as rod end 74. Thus, by engagement of operating lever 16 with the selectively moveable surface 67, an exteriorly applied operating force may be transmitted through the sealed housing 12 to actuate the resilient switching member 31 into its alternate position, without utilizing a separate driving member.

Means operatively connected to said sealing element for applying a force to the actuating mechanism may be embodied in operating lever 16, which is attached to the actuating mechanism through driving member 46, to thereby actuate the switch. As will be apparent, attachment may be accomplished by any of several means or the two components, lever 16 and driving pin 46, may be formed or cast as a unitary member. However, as shown in the drawings, attachment of lever 16 and drive member 46 may also be readily accomplished by allowing the tubular rivet portion 72 of member 46 to project through an aperture provided in actuating lever 16 whereupon shoulder portion 73 abuts against a surface of lever 16. Tubular rivet portion 72 is then flanged by appropriate means, thereby fixedly attaching lever 16 with the actuating mechanism of switch unit 10. As described generally hereinbefore, a spacer pad 25, positioned between housing 12 and operating lever 16, may be provided to prevent the accumulation of ice or other foreign material which could obstruct or otherwise impair the operation of lever 16. Pad 25 may be cast or molded to the desired configuration from a relatively soft, resilient material which will retain its resiliency at both high and low temperatures, such as one of the silicone rubbers. Filler pad 25 may be formed having one surface contour which is essentially complementary to the contour of the side of housing 12 and another surface contour essentially complementary to the contour of lever 16 and having apertures therein to accommodate parts interconnecting housing 12 with lever 16. Thus, the lever surface of resilient pad 25 is formed with a depression therein at one end to accommodate the end portion of lever 16. Also formed thereon is a protruding area portion which is complementary with a cavity 76 which forms on the opposite surface of lever 16 the striking area 17, which is adapted to be contacted by a cam or other loading device (not shown) in the operation of the switch. The spacing or filler pad 25 also may have cast into it a bowl-shaped aperture for accommodating the collar portion of driving means 46 and the arched interconnecting surface 68 associated with sealing member 45. In addition, pad 25 may have cast into it a hole to accommodate a set screw 77 associated with lever 16 which serves to provide adjustment of the preoperation travel of lever 16. When resilient pad 25 is installed, a cut may be made through the driving member aperture and the hole for receiving set screw 77 and the surfaces of the pad may be cemented to the housing 12 and lever 16 to prevent slippage.

In operation of switch unit 10 as herein described, operating lever 16 is depressed by hand or mechanical means, such as a cam or loading device, which applies sufficient pressure on area 17, to thereby move that end of the operating lever 16 toward housing 12. As lever 16 approaches housing 12, driving member 46 and the inner surface of sealing member 45 bonded thereto are caused to move with respect to outer surface 66 and housing 12 and sealing member 45 is thereby distorted. Movement of inner surface 67 along the longitudinal axis of driving member 45 is resisted by the shape and mounting of the sealing member but the selectively deformable seal 45 does establish a pivot which permits driving means 46 to be rotated with respect to housing 12. Slot 75 in housing 12 adjacent sealing member 45 serves as a guide for driving pin 46, whereby the pin is constrained to rotate through an arc in a plane parallel to the sides of housing 12. The inner portion of driving member 46 and the actuating arm 57 of the depressing pawl 42 are maintained in engagement by the force exerted by compressed return spring 44, therefore, any motion of the inner portion of driving member 46 toward the end of the housing 12 containing terminals 22 and 23 will cause the pawl 42 to rotate clockwise, as seen from actuating lever 16. As the pawl 42 rotates return spring 44 is further compressed, by plate 60 and pressure is applied to the actuating area of the switch contact element 31 by the positioned surface 59. Upon application of a suitable predetermined pressure on resilient switching member 31 the floating end 34 of switch contact element 31 is caused to be translated into its alternate position with a snapping action, thereby connecting contact 35 in circuit with the normally open terminal 24. Thus, it becomes apparent that the flow of electrical energy is switched from the path provided by common terminal 22 and normally closed terminal 23, to the path provided by common terminal 22 and normally open terminal 24. When the actuating force is removed from lever 16, resilient sealing means 45 by virtue of its shape and elastic properties returns to its original non-deflected position, and is aided therein by compressed return spring 44. Return spring 44 exerts a compressive force against rib 60 of depressing device 42, thereby rotating said depressing device 43 counterclockwise as viewed from operating lever 16. The actuating arm 57 of pawl 42 thus aids rod end 74 of driving pin 46 in its travel toward the end of housing 12 opposite terminals 22 and 23, and consequently aids in moving the depressed end of actuating lever 16 away from housing 12 until set screw 77 comes into abutting contact with housing 12. As the depressing pawl 43 is restored by return spring 44, pressure is removed from the actuating area of the switch contact element 31, thus allowing the free end 34 of resilient switching member 31 to return to its normal position. As a result, contact 35 carried by arm 34 is returned to its initial condition, in engagement with normally closed terminal 23, and the flow of electrical energy again established through the path provided by common terminal 22 and normally closed terminal 23.

It should be understood that modifications of the actuating mechanism are contemplated without deviating from the principles of the present invention. For example, in many applications for the switch 10 sufficient resiliency will be present in the sealing element or switching member 31 to eliminate the necessity for return spring 44 and consequently the physical means for supporting spring 44 may also be eliminated. Hence, it will then be obvious that the actuating mechanism will comprise only a sealing element, which includes a sealing member 45 and driving means 46, a device such as pawl 42, and suitable mounting means for the pawl such as a readily modified form of clevis 41.

Referring to Figure 5, which illustrates a modification of the present invention, a housing 12 is shown formed of a material and in manner similar to that hereinbefore described in connection with Figure 1. Selectively deformable resilient sealing member 81 in this embodiment does not serve as a structural load carrying member as well as a seal but serves only as a hermetic sealing member.

Sealing member 81 is physically similar to sealing member 46 illustrated in Figures 3 and 4 and described hereinbefore and may be fabricated of a light, thin metallic material. The outer surface of member 81 is hermetically secured in wall 82 of housing 12 whereas the inner surface is hermetically secured to driving means 41 which is adapted to extend through sealing member 81. The wall portion of housing 12 in the area of the sealing element is made thicker and of heavier construction and is provided with a counterbored recess 83 to accommodate a washer-like bearing element 84. As shown, shoulder portion 73 of driving member 41, in this embodiment, may be enlarged to project through the extended wall portion of housing 12 and to receive a pivot pin 85, which is transversely positioned through shoulder 73 and bearing support member 84 to provide a pivotal mounting at a point displaced from the sealing member 81. The inner edge of bearing washer 84 is beveled around its periphery to permit free rotation through sufficient angularity of driving pin 46 and is pressed into recess 83 and either bonded, staked, or otherwise secured therein. The operating lever 16 is attached to end portion 72 of driving member 41 in a manner described hereinbefore and the other end portion 74 thereof is permitted to pivot in a planar arc by means of slot 42 in the wall of housing 12.

In operation through the application of a suitable force to operating lever 16, drive member 46 is rotated about an axis displaced from sealing member 81, and flexes or distorts resilient member 81. Engagement of driving member 46 with pawl 42 causes it to rotate whereupon an actuating force is applied to switching member 31 by shoe 59 which causes arm 34 to snap to its alternate position and switch normally open contact 24 in circuit. Upon release of operating lever 16, pin 46, and depressing pawl 42 are returned to their normal, unoperated position by the action of compressed return spring 44 and the inherent resiliency of sealing member 81. As pawl 42 rotates to its normal position, surface 59 releases switch element 31, which allows arm 34 with contact 35 thereon to snap back and thereby opening the circuit to normally open terminal 24 and closing the circuit to normally closed terminal 23.

As described herein, the hermetically sealed switch of the present invention is adapted and has been found to reliably operate over wide ranges of atmospheric conditions while having small size and weight characteristics and while certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. A switching device comprising a housing having an aperture therein, a switching member normally disposed in a first position supported in said housing and adapted to be actuated from said first position to a second position by a force applied thereto, electrical contacts cooperating with said switching member disposed within said housing and adapted to allow different combinations thereof to be selectively connected in a circuit by actuation of said switching member into a second position, an actuating mechanism for developing the actuating force applied to said switching member, said actuating mechanism including a rotatable member pivotably supported in said housing and having a first surface for applying the actuating force to said switching member, a convex sealing element carried in a wall of said housing and adapted to seal said aperture, driving means connected with said sealing element and operatively associated with a second surface of said rotatable member for imparting movement thereto, and means operatively connected to said driving means for applying a force to said actuating mechanism to thereby actuate said switching device.

2. A switching device comprising a housing having an aperture therein, a switching member normally disposed in a first position supported in said housing and adapted to be actuated from said first position to a second position by a force applied thereto, electrical contacts cooperating with said switching member disposed within said housing and adapted to allow different combinations thereof to be selectively connected in a circuit by actuation of said switching member into a second position, an actuating mechanism for developing the actuating force applied to said switching member, said actuating mechanism including a rotatable member pivotably supported in said housing and having a first surface for applying the actuating force to said switching member, a convex metallic sealing element carried in a wall of said housing adapted to seal said aperture, a movable driving member extending through said aperture integral with said sealing element, said driving member being operatively associated with a second surface of said rotatable member for imparting movement thereto, and means operatively connected to said driving means for applying a force to said actuating mechanism to thereby actuate said switching device.

3. A switching device comprising a housing having an aperture therein, a switching member normally disposed in a first position supported in said housing and adapted to be actuated from said first position to a second position by a force applied thereto, electrical contacts cooperating with said switching member disposed within said housing and adapted to allow different combinations thereof to be selectively connected in a circuit by actuation of said switching member into a second position, an actuating mechanism for developing the actuating force applied to said switching member, said actuating mechanism including a rotatable member pivotably supported in said housing and having a first surface for applying the actuating force to said switching member, a deformable sealing element fixedly mounted within a wall of said housing and adapted to seal said aperture, driving means connected with said sealing element and operatively associated with a second surface of said rotatable member for imparting movement thereto, means mounting said driving means on said housing for pivotable movement about a point displaced from said sealing element, and means operatively connected to said driving means for applying a force to said actuating mechanism to thereby actuate said switching device.

4. A switching device comprising a housing having an aperture therein, a switching member normally disposed in a first position supported in said housing and adapted to be actuated from said first position to a second position by a force applied thereto, electrical contacts cooperating with said switching member disposed within said housing and adapted to allow different combinations thereof to be selectively connected in circuit by actuation of said switching member into a second position, an actuating mechanism for developing the actuating force applied to said switching member, said mechanism including a sealing element having a substantially U-shaped cross-sectional configuration carried by said housing and adapted to seal said aperture, and a member operatively connected with said sealing element for producing the force to thereby actuate said switching device.

5. A switching device comprising a housing having an aperture therein, a switching member normally disposed in a first positon supported in said housing and adapted to be actuated from said first position to a second position by a force applied thereto, electrical contacts cooperating with said switching member disposed within said housing and adapted to allow different combinations thereof to be selectively connected in circuit by actuation of said switching member into a second position, an actuating mechanism for developing the actuating force applied to said switching member, said mechanism including an element adapted to seal said aperture and having a surface secured to a wall of said housing, a surface selectively movable with respect thereto and an arched surface interconnecting said surfaces, and a member operatively connected with said movable surface for producing the force to thereby actuate said switching device.

6. A switching device comprising a housing having an aperture therein, a switching member normally disposed in a first position supported in said housing and adapted to be actuated from said first position to a second position by a force applied theerto, electrical contacts cooperating with said switching member disposed within said housing and adapted to allow different combinations thereof to be selectively connected in circuit by actuation of said switching member into a second position, an actuating mechanism for developing the actuating force applied to said switching member including a sealing element carried in a wall of said housing and adapted to seal said aperture, said sealing element comprising driving means and a sealing member, said sealing member having a first annular surface fixedly attached to the wall of said housing, a second annular surface concentric with said first surface and adapted to move with respect to said wall and fixedly attached to said driving means and a surface interconnecting said first and second surfaces, and means operatively connected to said driving means for applying a force thereto to actuate said switching device.

7. A switching device comprising a housing, a switching member normally disposed in a first position supported in said housing and adapted to be actuated from said first position to a second position by a force applied thereto, electrical contacts cooperating with said switching member disposed within said housing and adapted to allow different combinations thereof to be selectively connected in circuit by actuation of said switching member into a second position, an actuating mechanism comprising a pawl pivotably supported in said housing and arranged to apply the actuating force to said switching member, a sealing member having a first surface fixedly attached to the wall of said housing and a second surface interconnecting said first surface and adapted to move with respect to said wall, and driving means connected with said second surface and operatively associated with said pawl for imparting movement thereto, and means operatively connected to said driving means for applying a force to said actuating mechanism to thereby actuate said switching device.

8. A switching device comprising a housing having an aperture therein, a switching member normally disposed in a first position supported in said housing and adapted to be actuated from said first position to a second position by a force applied thereto, electrical contacts cooperating with said switching member disposed within said housing and adapted to allow different combinations thereof to be selectively connected in circuit by actuation of said switching member into a second position, an actuating mechanism for developing the actuating force applied to said switching member, said mechanism including a pawl supported in said housing and operatively associated with said switching member for applying the actuating force thereto and a selectively deformable sealing element having a substantially U-shaped cross-sectional configuration mounted in a wall portion of said housing for sealing said aperture, said element including driving means engageable with said pawl and adapted to transmit forces thereto through said housing by deformation of said sealing element, and means connected with said driving means for applying a force thereto to thereby actuate said device.

9. A switching device comprising a housing having an aperture therein, a switching member normally disposed in a first position supported in said housing and adapted to be actuated from said first position to a second position by a force applied thereto, electrical contacts cooperating with said switching member disposed within said housing and adapted to allow different combinations thereof to be selectively connected in circuit by actuation of said switching member into a second position, an actuating mechanism for developing the actuating force applied to said switching member, said mechanism including a pawl supported in said housing for pivotal movement and operatively associated with said switching member for applying a depressing force thereto and a selectively deformable sealing element adapted for pivotal movement mounted in a wall portion of said housing for sealing said aperture, said element including a sealing member and driving means, said sealing member having a first endless surface secured to said housing, a second endless surface secured to said driving means and an arched surface interconnecting said surfaces, said driving means adapted to engage said pawl and transmit forces thereto through said housing by pivotal deformation of said sealing element, and means connected with said driving means for applying a force thereto to thereby actuate said device.

10. A switching device comprising a housing having an aperture therein, a switching member normally disposed in a first position supported in said housing and adapted to be actuated from said first position to a second position by a force applied thereto, electrical contacts cooperating with said switching member disposed within said housing and adapted to allow different combinations thereof to be selectively connected in circuit by actuation of said switching member into a second position, an actuating mechanism for developing the actuating force applied to said switching member, said mechanism including a pawl arranged for pivotal movement and operatively associated with said switching member for applying a depressing force thereto, a clevis mounted in said housing for supporting said pawl and a selectively deformable sealing element adapted for pivotal movement mounted in a wall portion of said housing for sealing said aperture, and means operatively connected to said sealing element for transmitting forces through said housing to said pawl by deformation of said element to thereby actuate said device.

11. A switching device comprising a housing having an aperture therein, a switching member normally disposed in a first position supported in said housing and adapted to be actuated from said first position to a second position by a force applied thereto, electrical contacts cooperating with said switching member disposed within said housing and adapted to allow different combinations thereof to be selectively connected in circuit by actuation of said switching member into a second position, an actuating mechanism for developing the actuating force applied to said switching member, said mechanism including a pawl arranged for pivotal movement and operatively associated with said switching member for applying a depressing force thereto, a clevis mounted in said housing for supporting said pawl, resilient restraining means operatively associated with said clevis for biasing said pawl against pivotal movement and a selectively deformable sealing element mounted in a wall portion of said housing for sealing said aperture, said sealing element including a sealing member and driving means, said sealing member having a first endless surface secured to said housing and a second endless surface secured to said driving means, said driving means adapted to engage said pawl and transmit forces thereto through said housing by pivotal deformation of said sealing element, and means connected with said driving means for applying a force thereto to thereby actuate said device.

References Cited in the file of this patent

UNITED STATES PATENTS

| | | |
|---|---|---|
| 1,916,717 | De Giers | July 4, 1933 |
| 1,997,288 | Anderson | Apr. 9, 1935 |
| 2,419,180 | Unger | Apr. 15, 1947 |
| 2,432,273 | Woodson | Dec. 9, 1947 |
| 2,468,512 | Riche | Apr. 26, 1949 |
| 2,630,504 | Burch et al. | Mar. 3, 1953 |